Jan. 12, 1954 E. C. ELSNER 2,665,431
ADJUSTABLE SUPPORT DEVICE FOR LITTERS AND THE LIKE
Filed April 13, 1951 3 Sheets-Sheet 1
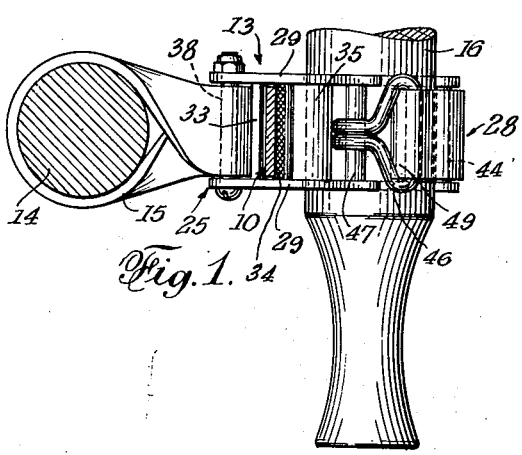
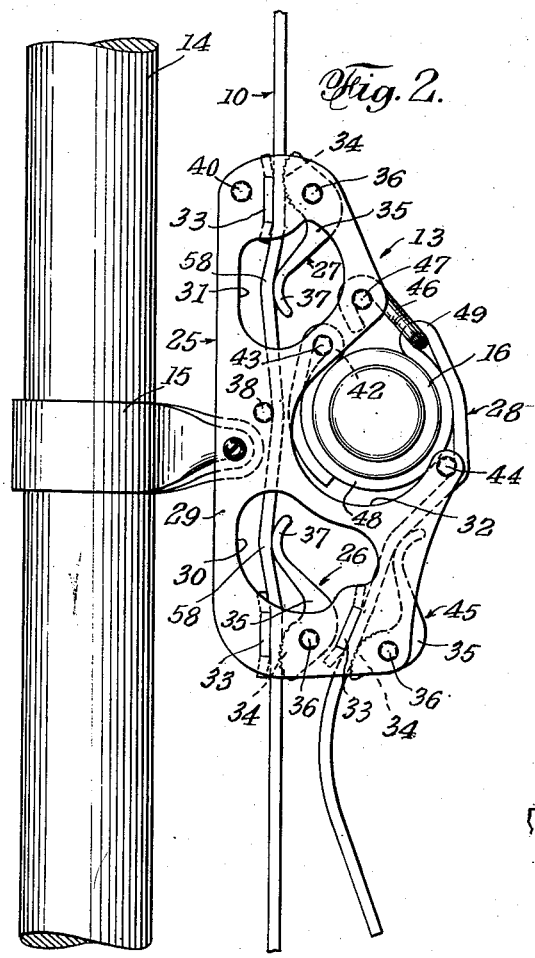
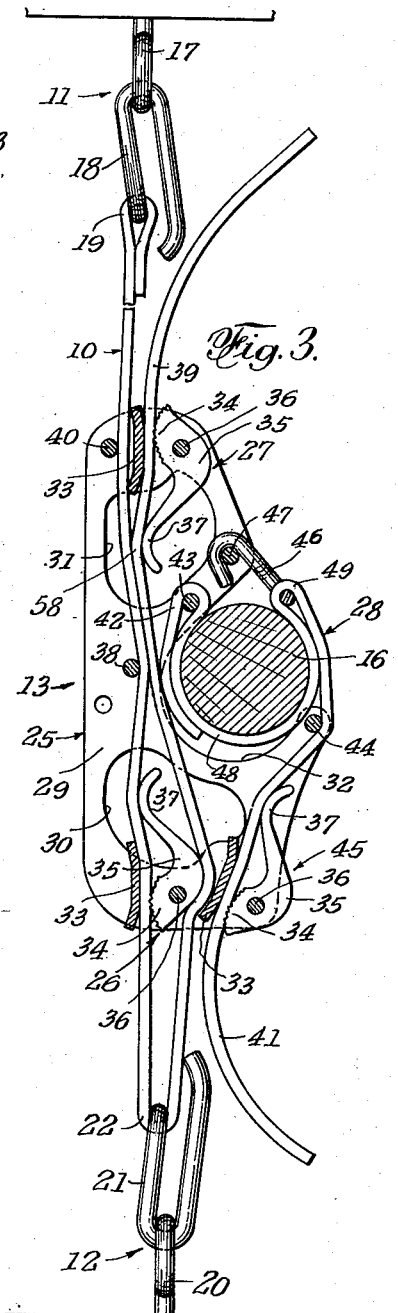
Inventor
EDWIN C. ELSNER
By C. G. Stratton
Attorney Jan. 12, 1954 E. C. ELSNER 2,665,431
ADJUSTABLE SUPPORT DEVICE FOR LITTERS AND THE LIKE
Filed April 13, 1951 3 Sheets-Sheet 2
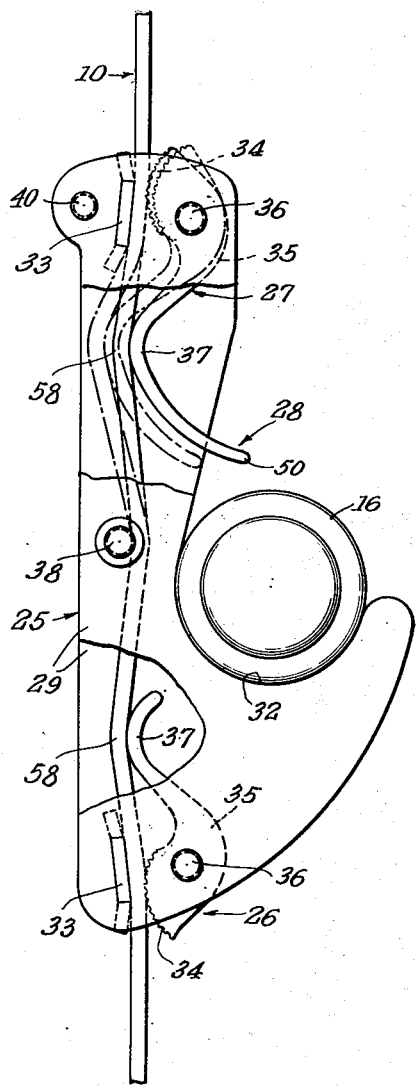
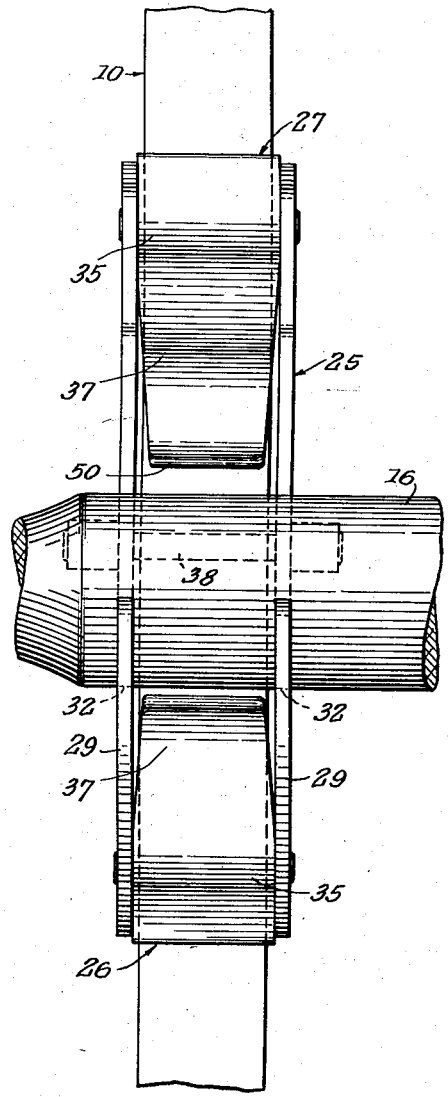
Inventor
EDWIN C. ELSNER
By C. G. Stratton
Attorney Jan. 12, 1954  E. C. ELSNER  2,665,431
ADJUSTABLE SUPPORT DEVICE FOR LITTERS AND THE LIKE
Filed April 13, 1951  3 Sheets-Sheet 3
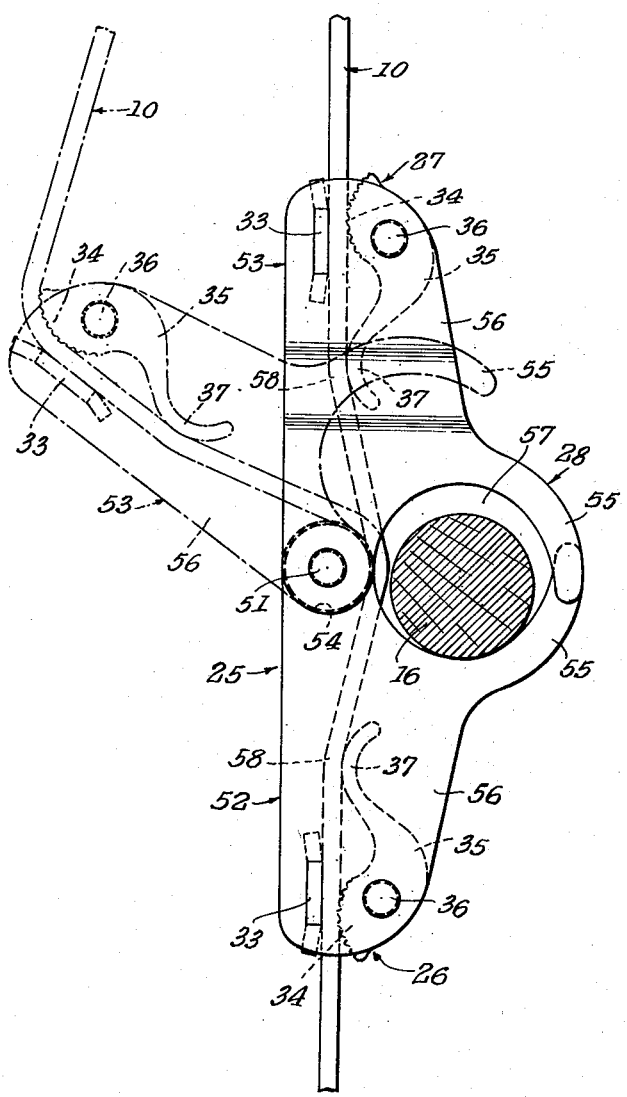
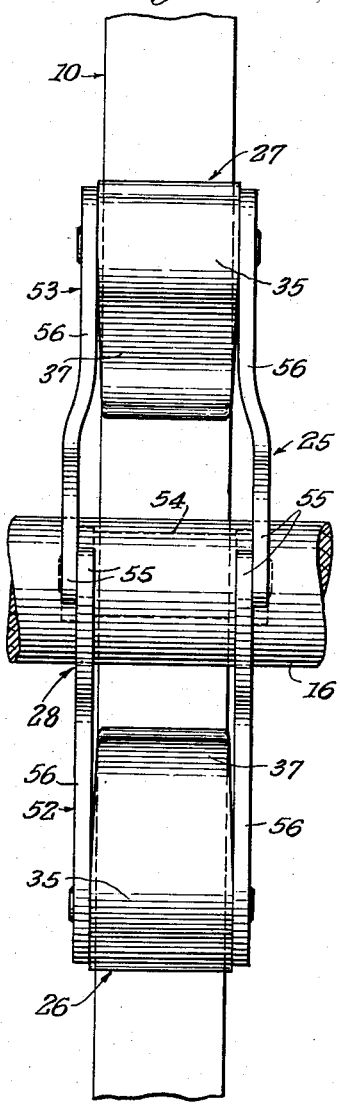
Inventor
EDWIN C. ELSNER
By C. G. Stratton
Attorney Patented Jan. 12, 1954

2,665,431

UNITED STATES PATENT OFFICE 2,665,431

ADJUSTABLE SUPPORT DEVICE FOR LITTERS AND THE LIKE

Edwin C. Elsner, Glendale, Calif.

Application April 13, 1951, Serial No. 220,855

12 Claims. (Cl. 5—9)

This invention relates to a device for supporting litters or stretchers and the like, and is more particularly adapted to engage and support the handles on the ends of the poles of a litter to safely support the same particularly during transport. While the present device will hereinafter be described as a litter support, it will be evident from the mode of its use that said device may be employed for other purposes.

In the transportation of litter-borne wounded, particularly in aircraft, the problem of safety to the occupants of the litters becomes increasingly important a crowding is increased. To provide permanently installed bunks in an aircraft, limits the use of such aircraft for other purposes.

Accordingly, it is an object of the present invention to provide novel and improved means for safely and securely supporting litters in vehicles and aircraft so that, even under crowded conditions, the occupants of the litters are conveyed with safety.

Another object of the invention is to provide means, as indicated, that are quickly installed in place and as easily removed to, thereby, enable use of a vehicle or aircraft for other purposes than as litter carriers.

More particularly, the invention contemplates the provision of a set of substantially vertically disposed webs or straps, a set usually comprising four straps in suitable arrangement according to the spacing arrangement of the four handles of a litter, and a plurality of novel litter-supporting devices adjustably strung on each strap so that said devices may be moved as desired along the straps to support one or more litters in a safe and secure manner by engagement with the poles or handles of said litters.

It is also contemplated and it is another object of the invention to provide a novel support device that is self-locking on the webs and yet is quickly released for adjustment along the strap as desired.

The straps herein contemplated are woven fabric webbing that are arranged tautly between upper and lower anchor ends, the straps, nevertheless, having limited stretchability and flexibility to serve as cushioning mounts for the litter-holding devices thereon, whereby the litters are cushion mounted and yet are firmly held in adjusted positions.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a top plan view of a preferred form of support device in operative engagement with the end of one of the poles of a litter or stretcher.

Fig. 2 is a side elevational view of said device, showing one manner of supporting the same on a strap or web.

Fig. 3 is a longitudinal sectional view of said device, showing another manner of engaging the same with a strap or web.

Fig. 4 is a partly broken side elevational view of another form of support device, the same being shown engaged with the strap in the manner of Fig. 2.

Fig. 5 is a front elevational view of the device shown in Fig. 4.

Figs. 6 and 7 are views, respectively similar to Figs. 4 and 5, of still another form of support device.

The present invention comprises, essentially, a strap 10 arranged between end anchor points 11 and 12, respectively, and one or more support devices 13 strung on strap 10. Optionally, the invention includes means such as a stanchion 14 arranged alongside of strap 10, and a loop 15 connected to each device 13 and slidingly encircling the stanchion to eliminate sway in the strap should the same be desired. One end 16 of one of the two poles of a litter is shown as supported by support device 13, and it will be clear, without the need for illustrating the same, that each of the other three pole ends of the litter are supported by devices 13 in the same way, and that the latter devices are strung on straps similar to strap 10.

The upper anchor end 11 is shown as an eye 17 fixed in an upper portion of a vehicle or aircraft, a hook 18 separably engaged with said eye 17, and a loop 19 formed on the end of strap 10 and serving to connect said hook to the strap.

The lower anchor end 12, in order to provide for suitable tautening of strap 10, is shown as an eye 20 fixed in a lower portion of said vehicle or aircraft, a hook 21 separably engaged with said eye 20, and an adjustable loop 22 formed in the lower end of strap 10, connected to hook 21 and held in releasable adjustment by device 13 or by the lowermost device should two or more devices be strung on strap 10. Fig. 3 shows said lowermost device while Fig. 2 shows one of the other upper devices.

The support device 13 comprises, generally, a frame 25, strap-gripping means 26 at one end of said frame to hold the device against downward movement along the strap, similar and oppositely arranged strap-gripping means 27 at the other end of said frame to hold the device against upward movement along the strap, and means 28 for releasably confining and supporting means such as a pole end 16, said means 28 being disposed between and forwardly offset from the gripping means 26 and 27.

The frame 25, as shown in Figs. 1 to 3, comprises a pair of spaced side plates 29 that are connected by transverse pins which will hereinafter be described, the plate spacing being slightly greater than the width of strap 10, as shown in Fig. 1. The plates 29 are exact duplicates, each being formed with a lower opening 30 to give side access to gripping means 26 so that the same may be manually released, with an upper opening 31 affording similar access to gripping means 27, and with a forwardly open recess 32 for freely accommodating pole end 16. Recesses 32 constitute a seat in which the pole end is received preparatory to confinement by means 28. Consequently, said recesses open angularly upward as well as forward.

The strap-gripping means 26 and 27 are each similar to the cam-wedge means disclosed in my Patent No. 2,490,862, and the gripping means shown in my Patent No. 2,538,641. Each said means comprises a plate 33 spanning between side plates 29 and against which an eccentric and roughened cam portion 34 of a lever 35, pivoted on cross pin 36, presses strap 10 through the medium of a curved extension 37 on said lever. Said extension 37 impinges on strap 10 which, when tautened, rocks lever 35 in a direction to grip the strap against plate 33. Manual pressure against extension 37 causes the portion of the strap engaged therewith to yield between plate 33 and a cross pin 38 so that cam portion 34 releases the strap.

From Fig. 2 it will be seen that, because the gripping means 26 and 27 are oppositely arranged, the cam portion 34 of the former holds device 13 against downward movement and cam portion 34 of the latter prevents upward movement of said device. Consequently, device 13 is firmly anchored on strap 10 and, so long as the strap is maintained in a tautened condition, cannot move in either direction along the strap.

When extension 37 of means 26 is pressed, device 13 can be slid down on the strap since means 27 locks only against upward movement of the device and will permit such downward sliding of the device. As soon as said extension of means 26 is released, both means 26 and 27 automatically coact to lock the device at the adjusted position along the strap. Similar, but upward sliding adjustment of the device is achieved by pressing extension 37 of means 27.

In Fig. 2, the means 26 and 27 act on spaced portions. In Fig. 3 the means 26 acts on that portion of the strap that extends between anchored ends 11 and 12 while means 27 acts on strap end 39, which, together with the main strap portion, forms loop 22. In the latter case, the main strap is reeved between upper plate 33 and a cross pin 40, then through gripping means 26, and the strap end 39 passes up outside of gripping means 26 and through gripping means 27.

From the arrangement of the strap in Fig. 3, it will be seen that the device 13 can be adjusted and automatically locked as before and, in addition, by pulling on strap end 39, the strap is automatically tautened.

It will be clear how stanchion 14 and loop 15 engaged therewith eliminate sway of the strap, it being understood that said loop slides quite freely on the stanchion.

The litter pole confining means 28, in the form of Figs. 1, 2 and 3, comprises a strap 41 similar to strap 10. One end of strap 41 is provided with a loop 42 that is strung on a cross pin 43 between side plates 29 above recesses 32. From loop 42, said strap 41 is trained over a cross pin 44 on the opposite side of the recesses to pin 43 and then through a strap-gripping means 45 substantially similar to and arrranged in the same way as means 26. The means 26 and 45 are placed side by side in the present form. A metal hook 46 is slidingly connected to strap 41 on that portion which is between pin 44 and loop 42, and a cross pin 47 above recesses 32 is adapted to be engaged by hook 46.

With strap 41 slack and hook disengaged from pin 47 and swung forwardly outward from the device, pole end 16 can be introduced into the seat provided by recesses 32 and rested upon the portion 48 of the strap, said portion being adjacent to loop 42. Now, the hook 46 is connected to pin 47 and the free end of strap 41 is pulled to tauten said strap between pin 43 and gripping means 45. Strap portion 48 will naturally train itself about the pole end 16 while the strap forms its own bight 49 for hook 46. In the process of tightening strap 41, the pole end is drawn upwardly from engagement with recesses 32 and is firmly encompassed by strap portion 48. It is understood that, upon release of manual pull on the free end of strap 41, gripping means 45 automatically grips the strap so that the pole end 16 is firmly confined in the sling formed by strap portion 48 and out of contact with any metal parts of device 13. In addition to the cushioning effect achieved, attrition on the pole end is eliminated. By pressing on extension 37 of means 45, the strap 41 is released so that the pole end drops to seat recesses 32. When hook 46 is disengaged from pin 47, the pole end can be removed from the support device.

In the modification of Figs. 4 and 5, the frame 25 is somewhat differently formed although it is elongated as before and has recesses 32 to provide a seat for the pole end 16. The strap-gripping means 26 and 27 are substantially the same as above described, and engage strap 10 in either of the arrangements thereof shown in Figs. 2 and 3. The means 28, however, is different in that the same simply comprises an elongated extension 50 on lever 35 of gripping means 27, said extension 50 protruding across the top of the seat for the pole end when the means 27 is in normal strap-gripping position. Accordingly, said pole end cannot become dislodged from the support device until extension 37 is pressed to effect retraction of the protruding extension 50.

While means 27 releases strap 10 when the lever 35 is rocked on its pivot 36, this can be safely done since gripping means 26 is not affected and continues to hold the support device locked in position on strap 10. In other respects, the modification is similar to the earlier-described form of support.

In the modification of Figs. 6 and 7, frame 25 is divided by a pivot 51 into two similar relatively pivotal frame sections 52 and 53. Gripping means 26 is carried by frame section 52 and gripping means 27 by frame section 53. A roller 54 on pivot 51 spaces the side plates of frame sections 52 and 53.

The means 28, in this form of support device, comprises hooked extensions 55 on the frame plates 56 that cooperate to enclose a circular opening 57 for pole end 16. The ends of extensions 55 may overlap, as shown, or may be somewhat spaced providing such spacing is substantially less than the diameter of the pole end to be received in opening 57.

It will be clear that by swinging one frame section relative to the other in a direction to separate extensions 55 of the respective sections, the pole end 16 may be introduced into opening 57 or removed therefrom. Although the dot-dash line position of section 53 shows swinging of said section relative to section 52, the two sections may be swung relatively with respect to the line of disposition of strap 10. In practice, the respective sections 52 and 53 would swing around their gripping means 26 and 27 while the pivot 51 moves laterally or forwardly. Of course, depression of extension 37 of gripping means 27 is necessary to allow the above pivotal movement of the frame sections.

In each of the three forms shown, the extensions 37 of strap-gripping means 26 and 27 form a shallow catenary 58 in the strap between each respective plate 33 and either pin 38 (Figs. 2 and 4) or roller 54 (Fig. 6). These pins 38 and roller 54 are exemplary since they may be replaced by a curved shoe or the like.

While the invention that has been illustrated and described is now regarded as the preferred embodiments, the construction is, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. The combination with a strap held taut between its ends, of a support device comprising a frame strung on the strap, spaced fixed members on the frame, a lever pivoted in the frame opposite each fixed member and provided with a portion on one side of its pivot to grip the strap which passes between said portion and said fixed member and said lever also being provided with a portion on the other side of said pivot to move the strap-gripping portion to a releasing position, the strap-gripping portions of the levers being oppositely directed so that one grips the strap to hold the support device against movement in one direction along the strap and the other grips the strap to hold the support device against movement in the opposite direction, and means carried by the frame to hold a member in releasable confinement.

2. The combination according to claim 1: the two strap-gripping levers being aligned along the strap, and the member-holding means being offset from the aligned strap-gripping levers and disposed therebetween.

3. In the combination according to claim 1: one end of the strap being fixedly held, an adjustable loop on the other end of the strap and an anchor through which said loop is threaded, the free end of the strap beyond said loop being in gripping engagement with the gripping lever that holds the support device against movement in the direction toward the fixedly held end of the strap.

4. The combination with a strap held taut between its ends, of an element-supporting device embodying two spaced and oppositely arranged strap-gripping means and cooperating to lock the device on the strap against movement in either direction therealong, one gripping means being arranged to grip the strap and hold said device against movement in one direction only, the other gripping means being arranged to grip the strap and hold said device against movement in the opposite direction only; a fixed longitudinal member disposed alongside of and substantially parallel to the strap; and a sliding connection between the element-supporting device and said longitudinal member.

5. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, each strap-gripping means comprising a transverse plate between the frame side plates, and a pivoted lever having an eccentric cam portion between which and said transverse plate the strap is adapted to pass, said lever having an extension adapted to rock said cam portion relative to said transverse plate.

6. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, the means for releasably engaging an element comprising a strap connected at one end to the frame, a hook strung on said strap, a transverse pin between the side plates of said frame and releasably engaged by said hook to form the strap into an encompassing sling for the element, and a gripping means to grip the other end of said strap.

7. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, the means for releasably engaging an element comprising a strap connected at one end to the frame, a hook strung on said strap, a transverse pin between the side plates of said frame and releasably engaged by said hook to form the strap into an encompassing sling for the element, and a gripping means to grip the other end of said strap, said latter gripping means being substantially similar to and arranged alongside of one of the means for gripping the support strap.

8. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, the means for releasably engaging an element comprising a strap connected at one end to the frame, a hook strung on said strap, a transverse pin between the side plates of said frame and releasably engaged by said hook to form the strap into an encompassing sling for the element, and a gripping means to grip the other end of said strap, said latter gripping means comprising a transverse plate between the frame side plates, and a pivoted lever having an eccentric cam portion between which and said transverse plate the strap is adapted to pass, said lever having an extension adapted to rock the eccentric cam portion of the lever relative to said transverse plate.

9. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, the means for releasably engaging an element comprising open recesses provided in said frame side plates and constituting an element-supporting seat, and an extension provided on one of the strap-gripping means and normally held by the strap in position to partly close said seat and to overstand an element in said seat.

10. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, each strap-gripping means comprising a transverse plate between the frame side plates, and a pivoted lever having an eccentric cam portion between which and said transverse plate the strap is adapted to pass, said lever having an extension adapted to impinge on the strap to rock said cam portion into gripping engagement with the strap, the means for releasably engaging an element comprising open recesses provided in said frame side plates and constituting an element-supporting seat, and an elongated extension on one of the mentioned pivoted levers and normally held by the strap in position to partly close said seat and to overstand an element in said seat.

11. A device of the character described, comprising a frame having spaced side plates between which a support strap is adapted to pass, a strap-gripping means at one end of said frame and arranged to grip said strap to hold said frame against movement along the strap in one direction, and a second gripping means at the other end of the frame and arranged to grip said strap to hold said frame against movement along the strap in the opposite direction, said frame being provided with means to releasably engage an element to support the same from the frame, the frame comprising two pivotally connected frame sections, each section mounting one strap-gripping means, and the means for releasably engaging an element comprising hooked extensions on the side plates of the frame sections and cooperating to encompass an element when the frame sections are longitudinally aligned, said pivotal connection constituting a hinge on which the two frame sections are adapted to be relatively hinged to separate the hooked extensions and free the element for removal from the device.

12. A device of the character described, comprising a frame having spaced side plates between which a longitudinal support strap is adapted to pass, transverse, longitudinally spaced fixed members extending between said side plates on one side of the strap, a pivoted lever opposite each member on the opposite side of the strap and provided with a strap-gripping portion, said strap-gripping portions being oppositely directed so that one grips the strap against its transverse member to hold the frame against movement in one longitudinal direction along the strap and the other grips the strap against its transverse member to hold the frame against movement in the other longitudinal direction, and means on the frame to releasably engage an element to support the same from the frame.

EDWIN C. ELSNER.

References Cited in the file of this patent
UNITED STATES PATENTS

| Number | Name | Date |
|---|---|---|
| 869,142 | Patterson | Oct. 22, 1907 |
| 1,516,564 | Barthelemy | Nov. 25, 1924 |
| 1,643,557 | Goldman | Sept. 27, 1927 |
| 2,391,051 | Windsor | Dec. 18, 1945 |
| 2,473,364 | Dickinson | June 14, 1949 |
| 2,490,862 | Elsner | Dec. 13, 1949 |
| 2,580,848 | Schulze | Jan. 1, 1952 |